UNITED STATES PATENT OFFICE.

ROBERT NESBITT, OF BURLINGTON, KANSAS.

PLASTIC WATERPROOF COMPOSITION.

1,217,335.     Specification of Letters Patent.     Patented Feb. 27, 1917.

No Drawing.     Application filed August 21, 1916. Serial No. 116,172.

*To all whom it may concern:*

Be it known that I, ROBERT NESBITT, a citizen of the United States, residing at Burlington, in the county of Coffey and State of Kansas, have invented a new and useful Plastic Waterproof Composition, of which the following is a specification.

This invention relates to a composition of matter particularly designed for use as a roofing material or as a means for lining cisterns, bins, and other receptacles to be made waterproof.

One of the objects of the invention is to provide a composition of matter which is cheap to manufacture, easy to apply, and will not crack as the result of climatic changes.

With the foregoing and other objects in view, the invention consists of the following ingredients combined in substantially the proportions set forth:

Portland cement ......... One part.
Fine sand ............... One part.
Ocher (red or yellow) ... One part.

The above ingredients are thoroughly mixed with sufficient water to form a thin mortar, and to the mixture is added a quantity of white lead, equal in bulk to approximately one-fifteenth of the volume of the above mixture.

In applying the composition, the same can be spread over a base made up of cement and sand in which a reinforcing material such as wire fabric or the like is embedded. Or if preferred, the said composition can be placed on any other suitably prepared base.

It has been found that the composition herein described is entirely waterproof, and will not crack as a result of climatic changes. Furthermore, because of its plastic nature, it can be readily spread over a surface in the same manner as thin mortar, and is therefore especially useful not only as a roofing material, but also as a waterproof lining for cisterns and the like.

The white lead constitutes an important ingredient because it prevents checking and cracking and also renders the composition less pervious to water and enables the composition to be spread smoothly.

What is claimed is:

The herein described composition of matter for use as a roofing or the like, consisting of cement, one part, sand, one part, ocher, one part, and an amount of white lead equal in bulk to approximately one-fifteenth of the amount of the other ingredients, all of said parts being mixed with water to form a mortar.

In testimony that I claim the foregoing as my own, I have hereto affixed my signature in the presence of two witnesses.

ROBERT NESBITT.

Witnesses:
H. F. PILCHER,
S. A. GRUBB.

Copies of this patent may be obtained for five cents each, by addressing the "Commissioner of Patents, Washington, D. C."